United States Patent
O'Kelley et al.

(10) Patent No.: US 7,125,576 B2
(45) Date of Patent: Oct. 24, 2006

(54) HIGH PROTEIN TORTILLAS

(75) Inventors: Lauren April O'Kelley, North Palm Beach, FL (US); Meghan Lea Meller, Folsom, CA (US); Michael Shaun Madden, North Palm Beach, FL (US); Hordur G. Kristinsson, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 19 days.

(21) Appl. No.: 10/889,927

(22) Filed: Jul. 12, 2004

(65) Prior Publication Data

US 2005/0013917 A1    Jan. 20, 2005

Related U.S. Application Data

(60) Provisional application No. 60/486,564, filed on Jul. 11, 2003.

(51) Int. Cl.
    *A23L 1/02*    (2006.01)
(52) U.S. Cl. ............ 426/657; 426/513; 426/516
(58) Field of Classification Search ......... 426/657, 426/513, 516
    See application file for complete search history.

(56) References Cited

U.S. PATENT DOCUMENTS

| | | | |
|---|---|---|---|
| 3,840,679 A * | 10/1974 | Liepa et al. | 426/104 |
| 5,384,149 A | 1/1995 | Lin | |
| 6,136,959 A | 10/2000 | Hultin et al. | |
| 6,309,688 B1 * | 10/2001 | Sanchez y de la Camara | 426/549 |
| 6,451,975 B1 | 9/2002 | Hultin et al. | |
| 2002/0054951 A1 * | 5/2002 | Hoshino | 426/641 |

FOREIGN PATENT DOCUMENTS

| | | |
|---|---|---|
| AU | 7008481 | 11/1982 |
| FR | 905299 | 11/1945 |
| JP | 2002-369648 | * 12/2002 |

OTHER PUBLICATIONS

Chemical Abstracts. AN 90:167038. Protein Quality Evaluation of Corn Tortillas, Wheat Flou Trtillas, Pinto Beans, Soybeans and Their Combinations. Inventor: Valencia et al. Reference published 1979. Abstract published 5-1984.*
Chemical Abstract. AN 87;20801. Utilization of Whole Undefatted Glandless Cottonseed Kernels and Soybeans to Protein-Fortify Corn Tortillas. Inventor: Green et al. Reference published 1977. Abstract published 5-1984.*
Food Network webpage. French Omelet. Published 2002. http://www.foodnetwork.com/food/cda/recipe_print/0,1946,FOOD_9936_21788_Print-Recipe-4X6-CARD,00.html.*
Kraft Foods webpage. Original publication date unknown. http://www.kraftfoods.com/main.aspx?s=product&m=product/Product_display&Site=1&Product=4470001206.*
Calorie Control Council. "Reduced-Calorie Sweetners: Sorbitol" 2002 Accessed Feb. 1, 2003; http://www.caloriecontrol.org/sorbitol.htm.

(Continued)

*Primary Examiner*—Anthony Weier
(74) *Attorney, Agent, or Firm*—Saliwanchik, Lloyd & Saliwanchik (57) ABSTRACT

The subject invention provides novel protein-rich tortillas. In a specific embodiment, the subject invention provides flat, thin tortillas that have chicken protein. Other meats can also be used to provide the protein component. Advantageously, the tortillas of the subject invention can be used as a replacement for traditional flour or corn tortillas.

13 Claims, 2 Drawing Sheets
(1 of 2 Drawing Sheet(s) Filed in Color)

OTHER PUBLICATIONS

Ennen, Steve (Aug. 2001) "Trehalose gets GRAS" IN *Food Processing*, pp. 44.

Hunt, A., Park, J., Zoerb, H. "Trehalose as functional cryoprotectant for fish proteins" IFT Technical Program Paper 2002. Accessed Feb. 1, 2003; http://ift.confex. Com/ift/2002/techprogram/paper_11920.htm.

Katz, Fran (Oct. 1999) ""How Nutritious?" Meets "How Convenient?"" In *Food Technology* 53(10):44-50.

Kelleher S.D. et al.: "Functional fish protein isolates prepared using low ionic strength, acid solubilization/precipitation" 2001, Sakaguchi M.(editor), XP001204401 cited in the application p. 404-414.

Parades-Lopez O. et al.: "A Review of Tortilla Production technology" *Bakers Digest*, Siebel Publishing Co., Pontiac, Illinois, US, vol. 57, No. 5, Sep. 3, 2004, p. 16-20, 22, 25 XP001147497. ISSN: 0191-6114.

Powers, S. and S. Dodd *Total Fitness: Exercise, Nutrition, and Wellness* 2nd Allyn and Bacon, boston, 1999, pp. 158.

Racotta V. et al: "Use of Whey Proteins for Supplementing Tortilla" *Journal of Agriculture and Food Chemistry*. American Chemical Society. Washington, US, vol. 27, No. 4, Jul. 1979 (1979-07), pp. 668-672, XP002065084.

Schmidt, R. Programs of the Food Safety and Inspection Service. In *Government Regulations and the Food Industry*. University of Florida Coursebook, Gainesville, 2002, p. 326.

The Food Institute's Food Industry Review 2002 Edition. *Food Expenditures*. Accessed Feb. 5, 2003; http://www.foodinstitute.com/catalog/tocfir.pdf.

Wetherell Jr., J. Regulations & Legal Affairs Patent Infringement-:The role of Opinions of Counsel. Jun. 2000. Accessed Apr. 15, 2003. http://www.devicelink.com/mdep/archive/00/06/wetherell.html.

"9 CFR 424—Preparation and Processing Operations" *Code of Federal Regulations* Online. Accessed Nov. 26, 2004 p. 625-647, XP002308970. http://a257.g.akamaitech.net/7/257/2422/14mar200110800/edocket.access.gpo.go v/cfr_2003/pdf/9CFR424.21.pdf.

* cited by examiner

HIGH PROTEIN TORTILLAS

CROSS-REFERENCE TO A RELATED APPLICATION

This application claims the benefit of U.S. provisional application Ser. No. 60/486,564, filed Jul. 11, 2003.

BACKGROUND OF THE INVENTION

Tortillas are traditionally thin disks of unleavened bread that are made from cornmeal or wheat flour. According to Mayan legend, tortillas were invented by a peasant for his hungry king in ancient times. The first tortillas, which date back centuries, were made of native corn with dried kernel.

In Mexico and some Central American countries, corn is transformed into food products by a process known as "nixtamalization", which involves the alkaline cooking of whole corn kernel and breaking of the hull down toward a partially gelatinized state. Afterwards, the cooked corn is washed, ground and dried to give corn masa flour for different product applications. The main edible product of the traditional process is the "tortilla" which is a flat, round, unfermented and baked thin pancake produced from lime-cooked maize.

Whereas tortillas have been a staple in the Latin American diet for thousands of years, consumers in the United States are just now beginning to discover the convenience, versatility, and great taste of tortillas. Thanks in part to the widespread popularity of Mexican and Southwestern cuisines, many Americans now enjoy eating tortillas. In fact, tortillas are more popular today in the U.S. than all other ethnic breads, such as bagels, English muffins and pita bread.

The versatile tortilla can be warmed in the oven, steamed, grilled, fried, heated in a microwave or toaster or baked in the oven. Accordingly, tortillas have found their place in the American mainstream diet, where they now serve as substitutes for traditional breads in such popular fare as hot dogs, lasagna, pitas, sandwiches and pizza. Tortillas can be used to hold a variety of fillings, used as tasty food scoops, toasted and topped with salad, or served hot and plain.

In 2000, tortilla sales in the U.S. reached the $4.4 billion mark and the sales are expected to continue to grow. As testament to their popularity, the Tortilla Industry Association (TIA) estimates that Americans consumed approximately 85 billion tortillas in 2000 (not including tortilla chips).

Thus, there is an increasing demand and use of industrially prepared tortillas so that sufficient numbers of tortillas can be produced to meet the demands of consumers, such as convenience, availability, price and quality.

Also, as people work longer hours there is less time in the day for households to create and cook healthy meals so, instead, they often turn to fast food and restaurants. Recent trends in convenient food consumption have indicated that convenience may be more important to consumers than nutrition.

Unfortunately, although tortillas are unquestionably convenient, versatile, and great tasting, traditional tortillas are not particularly healthful. They are high in carbohydrates and fat, and contain ingredients that are not appropriate for high protein diets, or for individuals with certain food allergies. Although soy protein has been proposed as an ingredient for production of higher protein tortillas, there are a variety of advantages of animal protein compared to soy protein and many consumers prefer animal protein.

Accordingly, there is a significant need for a new improved tortilla that is high in protein, low in fat, has great taste and texture, and can be readily produced, stored and used. The current invention addresses these and other related needs.

BRIEF SUMMARY OF THE INVENTION

The subject invention provides novel protein-rich tortillas. In a specific embodiment, the subject invention provides flat, thin tortillas that comprise chicken protein. Other proteins extracted from animals can also be used to provide the protein component. Advantageously, the tortillas of the subject invention can be used as a high animal protein, low fat replacement for traditional flour or corn tortillas.

The protein component of the tortillas of the subject invention can be pure animal protein, compared to flour and corn tortillas that have been fortified with, for example, soy protein. In a preferred embodiment, the tortilla's unique main ingredient is isolated chicken protein that is used to produce a low carbohydrate tortilla with very low fat content.

A further aspect of the subject invention pertains to the unique and advantageous process for making high protein tortillas. The formulation and process of the subject invention result in a longer product shelf life and less microbial deterioration compared to most refrigerated chicken (or other meat) products.

Advantageously, the subject invention provides innovative products for health conscience consumers desiring a protein-rich alternative to high carbohydrate tortillas and sandwich breads. The high protein food tortillas of the subject invention provide a flavorful, as well as a functional, vehicle for a wide variety of foods including, for example, fresh salads or grilled vegetables. The tortillas of the subject invention are a healthy replacement for the typical high calorie, high fat tacos, burritos, and sandwich breads on the market today.

BRIEF DESCRIPTION OF THE FIGURES

The file of this patent contains at least one drawing executed in color. Copies of this patent with color drawings(s) will be provided by the Patent and Trademark Office upon request and payment of the necessary fee.

DETAILED DESCRIPTION OF THE INVENTION

The subject invention provides unique high protein tortillas, and advantageous methods for making and using these tortillas. Specifically exemplified herein are tortillas comprising chicken protein. These tortillas are advantageous because of their high protein content, the presence of very little (or no fat), their great taste and pleasing texture, their storage characteristics, and their versatility of use.

Thus, the subject invention provides innovative food products offering health conscience consumers a protein-rich alternative to traditional tortillas and sandwich tortillas.

The protein rich tortillas of the subject invention provide a flavorful, as well as a functional, vehicle for a wide range of foods. The high protein tortillas are a healthy replacement to the typical high calorie, high fat tacos, burritos, and sandwich tortillas on the market today.

In a preferred embodiment, the tortilla of the subject invention comprises at least 50% animal protein, more preferably the tortilla comprises more than 60% animal protein, and most preferably the tortilla comprises over 70% animal protein.

The tortillas of the subject invention can be flavored and seasoned to suit any application from Mexican, Italian, Asian, Caribbean to traditional American cuisine with endless possibilities of fillings.

In a preferred embodiment, the chicken tortillas of the subject invention are flat, thin tortillas of chicken that can be used as a protein based alternative to flour or corn tortillas. The chicken tortilla's unique main ingredient is isolated chicken protein that has been processed through solubilization of muscle tissue using alkaline conditions and centrifugation to separate proteins from the less desirable components of chicken (Kelleher, S. D.; Hultin, H. O. Functional Chicken Muscle Protein Isolates Prepared Using Low Ionic Strength, Acid Solubilization/Precipitation. American Meat Science Association. $53^{rd}$ Annual Reciprocal Meat Conference, 2002, pp 76–81). The end product is a low carbohydrate material that has negligible fat content.

The tortillas of the subject invention can be made in just about any shape. Specifically exemplified herein is the production of traditional round tortillas. The size of the tortilla can also be adjusted to suit a particular need. Thus, for a round tortilla, the diameter may be, for example, from about 3 inches to 12 inches or more. Preferably, the diameter is from about 5 to about 10 inches. More preferably, the tortilla is 8 inches in diameter. The preferred thickness of the tortilla can also be readily determined by a person skilled in the art. The thickness may be, for example, from about 1/32 inch to 1/4 inch or more. The tortilla may weigh, for example, from about 20 to about 80 grams and preferably from about 30 to about 70 grams. More preferably, the tortilla weighs about 50 grams.

In a specific embodiment, one round, 8-inch chicken tortilla weighs approximately 50 grams and is visually appealing with spices sprinkled throughout and baked until golden. The tortillas of the subject invention have a unique meaty texture and can have a spicy herb baked chicken flavor profile. Advantageously, the tortilla of the subject invention are flexible, i.e., the tortillas are a vehicle for holding a filling without breaking or tearing, the tortillas are foldable without tearing or breaking, and the tortillas are rollable without tearing or breaking.

The chicken tortillas can be readily utilized by quick serve restaurants (QSRs) and casual dining restaurants in a similar manner as corn and flour tortillas. Thus, the subject invention provides a low-carbohydrate, low (or no) fat meat protein product for the consumer on the go who does not have the time or energy to prepare traditional nutritious meals. When dining out, many menu items are of high fat and high carbohydrate content; with the introduction of protein-rich tortillas, consumers will now have the option of selecting healthier menu items.

The ingredients of the tortillas of the subject invention meet important functional needs as well as flavor acceptability. In addition to meat protein, in a preferred embodiment of the subject invention, the tortillas of the subject invention further comprise a sweetening agent and one or more flavor protectors/enhancers. Specifically exemplified herein is the use of trehalose as a sweetener, and sodium tripolyphosphate and sodium chloride as flavor protectors/enhancers. These various ingredients can also have other benefits such as cryoprotection during processing and/or storage.

Properties of the ingredients sodium tripolyphosphate, trehalose, and sorbitol aid in proper gelation needed for a desirable texture and the ability to bind water providing a juicier chicken product. The salt and sugar content can be adjusted as described herein to achieve a balance between sweet and savory. Water is used as a solvent for the added ingredients and increases fluidity of the uncooked chicken mixture.

Trehalose is a naturally occurring sugar that has a mild sweetness (only 45% as sweet as sucrose) and protects and preserves cell structures (Ennen, Steve "Trehalose gets GRAS". In *Food Processing*, August 2001, pp 44). Additional functional properties of trehalose include decreased $a_w$ (positively controls water functionality at protein/water interface) and decreased cariogenic potential (less calories than sucrose), and it acts as a cryoprotectant during freezing and storage (Hunt, A.; Park, J.; Zoerb, H. "Trehalose as functional cryoprotectant for fish proteins" IFT Technical Program Paper, 2002.

The tortillas can be formulated with sucrose or other simple carbohydrates but are preferably formulated with trehalose to bring down the sweetness while preserving the cryoprotectant functionality. Sorbitol is another sweetener (60% as sweet as sucrose) that can be used and has similar properties to that of trehalose. It is a humectant which prevents moisture content loss of the product and is also a texturizing agent (Calorie Control Council "Reduced-Calorie Sweeteners: Sorbitol," 2002).

Sodium tripolyphosphate's primary function is to help protect flavor and decrease the amount of juices cooked out of the product.

The regulated quantities of sorbitol is not to exceed 2 percent of the weight of the formula and sodium tripolyphosphate is not to exceed 0.5 percent of total product, these values are specified in 9CFR424.21 (U.S. Government Printing Office via GPO Access CITE: 9CFR424.21. Code of Federal Regulations Title 9, Volume 2. Use of food ingredients and sources of radiation, page 625–647 Sec. 424.21).

Sodium chloride enhances flavor and assists in the cryoprotectant qualities of the sodium tripolyphosphate and trehalose. The tortillas may have any number of various spices added to suit any menu application. Exemplary spices include ajwain seed, allspice, annatto seed, basil, charnushka, chervil, chili powder, Chinese 5 spice powder, cilantro, cloves, coriander, cumin, curry, dill, fennel, fenugreek, galangal, garlic, ginger, kala jeera, lemongrass, lemon peel, marjoram, msg, mustard seed, oregano, paprika, parsley, peppercorn, rosemary, saffron, sage, sesame seed, sumac, tarragon, thyme, and zatar.

Process Description

The initial preparation of high protein tortillas prepared according to the subject invention can begin with the isolation of chicken protein through the use of a method adapted from procedures used for isolating muscle protein from fish (Kelleher, S.; Feng, Y.; Kristinsson, H.; Hultin, H. O.; McClements, D. Functional Fish Protein Isolates Using Low Ionic Strength, Acid Solubilization/Precipitation, 2001, pp 1–10).

The production starts with the raw mechanically separated chicken being thawed and brought to the process line. The processing rooms are preferably maintained at refrigerated temperatures in the range of 35°–40° F. (1.7°–4.4° C.). The chicken is weighed and combined with filtered water at a ratio of 1 part mechanically separated chicken to 9 parts water (1:9 ratio) in an enclosed tank that is mixed at medium speed for homogenization. The homogenate is piped through a positive displacement pump to a batch pH adjustment system. This system gently mixes homogenate while a calibrated probe measures pH with an expected initial range of 5.0–6.0.

An automated reagent feed system adjusts the pH to a range of 10.0–11.0 using 2M sodium hydroxide; this increase in pH solubilizes the chicken muscle proteins. The alkaline homogenate is piped through a positive displacement pump to a large, cold-jacketed centrifuge and is centrifuged at 10,000 rpm for 20 minutes. This separates muscle protein from lipid, membranes, bone particulates and any other undesirable components. The separated muscle protein layer is pumped through filtration screens to remove the undesirable particles. The filter membranes are kept clear by means of a parallel flow system in order to prevent concentration polarization. The undesirable components are kept within a tank for stabilization processes. They can be processed and utilized for animal feeds and/or laboratory analyses.

The soluble muscle proteins continue to empty into a second batch pH adjustment system. The soluble chicken proteins are adjusted to a pH of 5.0–6.0 using 2M HCl to aggregate proteins and separate them out during the next centrifuge process. The chicken proteins are piped through a positive displacement pump to a large, cold-jacketed centrifuge. The protein solution is centrifuged at 10,000 rpm for 20 minutes to separate pure chicken protein solids from liquid. The water is than emptied into a waste tank for stabilization processes and filtration then recycled back into the initial water tank of the processing system.

The protein isolate is removed from the centrifuge and placed into a batch mixer. In the mixer, the protein isolate is combined with dry ingredients pre-dissolved in water. The protein mixture is blended at high speed for 2 minutes to create a light and airy foam. The foam mixture is pumped into a batch pH adjustment system where the pH is adjusted to a range of 7.0–8.0, using 2M NaOH. This pH is preferable for the gelation of the tortillas when heated.

The mixture is fed onto circular, Teflon molds constructed as part of a conveyor belt and with vibratory movement for spreading. The product moves along the belt conveyor and are cooked through a 375° F. (191° C.) tunnel oven for 10 minutes. After cooking, the tortillas fall out of the Teflon molds and onto another belt conveyor positioned lower than the belt of the oven system.

The tortillas are moved along the conveyor system where an automated dispenser drops a polyester insert on top of each tortilla as a preparation for packaging. The tortillas are manually stacked and placed into a pre-labeled, clear vinyl bags, and vacuum-sealed.

The final stage is manual packaging in boxes and storage in a refrigerated room until shipment and distribution. The chicken tortillas are shipped in refrigerated trucks to ensure quality and safety.

Any excess protein can be baked into protein chips or crumbs for other food applications such as salad toppings.

Fish, turkey, pork, venison, and beef are other meat sources that can be used to provide the animal protein for the tortillas of the subject invention.

Figure 1:
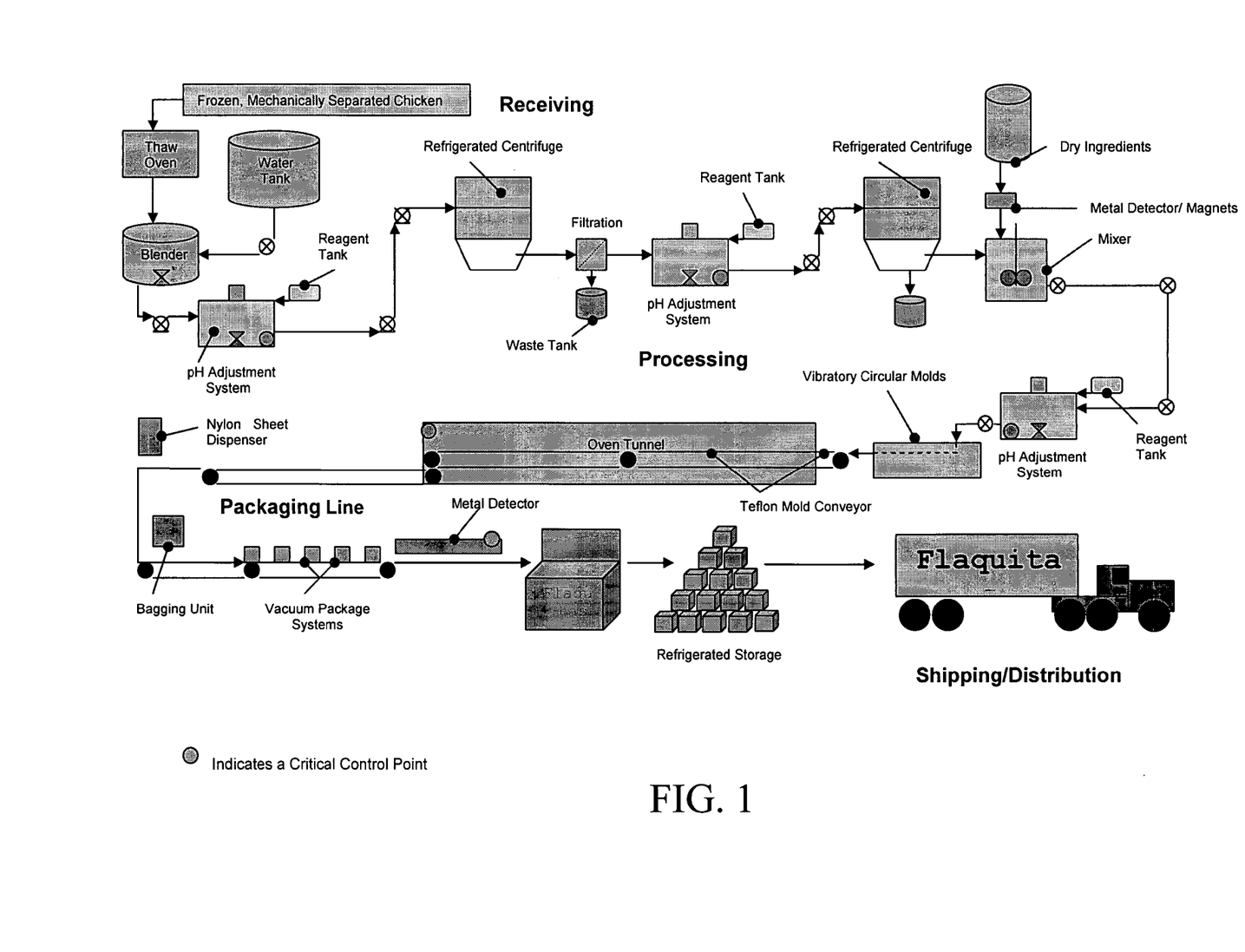
FIG. 1 shows an example of a production line for the tortillas of the subject invention.
Figure 2:
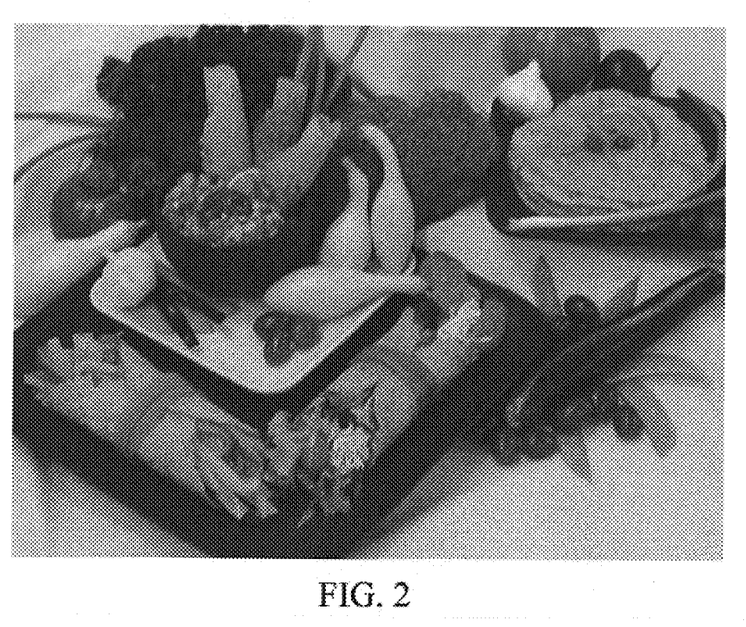
FIG. 2 shows the appearance of examples of tortillas of the subject invention.

An example of a process line is shown in FIG. 1.

Nutritional Information

In comparing the various corn and flour tortillas available in the market to the chicken tortillas of the subject invention, the functionality of holding various fillings is similar. However, one primary difference separates the tortillas of the current invention and that is the nutritional characteristics. Tortillas produced according to the subject invention are lower in calories (62 calories in one embodiment) than the flour tortillas (130 calories) with most of the calories in the form of protein. Protein is normally used for biological building blocks and not as a primary source of energy. The tortillas of the subject invention also have a higher proportion of protein (12.6 grams in one embodiment) compared to flour and corn tortillas (4 grams and 1 gram, respectively). This allows these tortillas to be an excellent food for building muscle mass or as a part of a high protein diet (i.e. Atkin's Diet).

Another nutritional advantage of the tortillas of the subject invention is that they are an essentially fat free food. Corn and flour tortillas have a typical fat content of 1 gram and 2.5 grams, respectively. Additionally, the tortillas of the subject invention are very low in carbohydrates (2.6 grams) when compared to corn and flour tortillas (11 grams and 23 grams, respectively). This minimal amount serves as a functional aspect to the food rather than a sweetener.

Another major advantage of the high protein tortillas is their use in specialized diets. For example, these tortillas can be utilized as a gluten-free alternative for individuals with wheat allergies, wheat/gluten intolerances, and/or gluten-sensitive enteropathies. These are very serious disorders with severe or fatal outcomes if a strict diet is not followed.

Shelf Life and Safety Evaluation

The method by which the tortillas of the subject invention are produced extends the shelf-life and reduces microorganisms because of the use of isolated chicken protein as an ingredient. The baking tunnel is at a constant cooking temperature of 375° F. (191° C.) which ensures each tortilla has reached an internal temperature of 165° F. (74° C.) for at least 15 seconds to eliminate any remaining microorganisms.

The protein content of the stored samples also remains close to that of a fresh tortilla in terms of retaining nutrition quality.

Shelf-life study samples were stored at 38.7° F. (3.7° C.) inside clear storage bags that were vacuum-sealed. To imitate normal usage, samples were stored under normal refrigeration conditions and vacuum sealed. The tortillas were removed from refrigerated storage, opened, closed by slide sealing without vacuum, and placed back into refrigerator to emulate home/retail use. After 5 days the appearance, texture, and odor did not change.

The tortillas are refrigeration stable for at least 1 month (vacuum-sealed) before opening, and approximately one week after opening. The tortillas are heated for 10 minutes at 375° F. (191° C.) to achieve the desired internal temperature of 165° F. (74° C.) (The Educational Foundation of the National Restaurant Association. The Flow of Food through the Operation. Applied Foodservice Sanitation, 4th. *National Restaurant Association*, Illinois, 1995; p. 135).

QSR and Casual Dining Safety Hazards

The tortillas of the subject invention (also known as Flaquitas™) should be stored in the refrigerator at temperatures between 32–40° F. (0–4.4° C.). The tortillas can be served hot or cold with no concern of pathogenic microorganisms as long as the product does not fall into the temperature danger zone (>40° F.). Once the tortillas are opened, the package should be resealed, refrigerated immediately after use, and it is recommended that the entire package be finished or discarded within one week.

Competitive Framework

In one example, the tortillas of the subject invention can be used by healthy fast food restaurants such as Nature's Table, Roly Poly and Pita Pit, which all have similar sandwich concepts and set ups into which the current invention could be easily integrated without any additional equipment or ingredients. Another focus is to revolutionize the "not so healthy" QSRs such as McDonalds, Wendy's, Chick-fil-a and Taco Bell to create more of a positive healthful image for "fast food." The restaurants can incorporate Flaquitas along side their everyday menus of sandwiches and tortillas.

Consumers are becoming more health conscience with an increase of knowledge in diets and nutrition. They want healthier, lighter menu items in the same quick and convenient manner to which they are accustomed. This means QSRs are changing with consumer demand. Many consumers are now aware of their protein, carbohydrate and fat intake and the subject invention can provide these QSRs and casual dining establishments with Flaquitas to create innovative and healthful menu selections. One Flaquita has one daily serving of protein; the Flaquitas have more protein per serving than a regular corn or flour tortilla. Another advantage is that with corn and flour tortillas or pitas there are usually four components: tortillas or pitas, meats, vegetables and sauces. Optional fillings include fruits and cheeses.

Using the subject invention, the QSR only needs three components: tortillas, vegetables and sauces still having the same or higher quality nutrition and the possibility to save time and money in the long run.

The versatility of the product of the subject invention is another advantage in that tortillas can be formulated to suit each client's needs with custom blends of herbs and spices to create a tortilla unique to their establishment.

In another embodiment, the protein tortillas of the subject invention are available to individual consumers for home use via sales in retail stores such as grocery stores, gourmet food boutiques, and convenience stores.

A few examples of what tortilla flavors can be offered include: Spicy Mexican, Italian Herb, Asian Spice and Classic Garden Herb. Flaquitas can be sold in bulk packages depending on the needs of the customers.

As used herein the term "flavor protector/enhancer" refers to ingredients that add an additional layer of flavor to the tortillas of the subject invention and preserve the flavor.

As used herein the term "pure protein" refers to protein isolated from animal muscle that is substantially protein and is interchangeable with "isolated protein," "alkaline extracted protein," or "protein isolate," as used herein.

As used herein the term "animal protein" refers to pure proteins isolated from chicken, fish, turkey, pork, poultry, venison, or beef muscle and is interchangeable with "meat protein".

Following are examples that illustrate procedures for practicing the invention. These examples should not be construed as limiting. All percentages are by weight and all solvent mixture proportions are by volume unless otherwise noted.

EXAMPLE 1

Ingredient Formulation

Table 1 provides one example of the ingredients of a high protein tortilla of the subject invention.

TABLE 1

Ingredient Formulation

| Ingredient | % | Functionality |
| --- | --- | --- |
| MSM Chicken isolated | 50.000 | Main component for structure and bulk, flavor and mouthfeel. |
| Water | 45.000 | Increase volume and fluidity, solvent for ingredients |
| Sorbitol | 0.0150 | Cryoprotectant, preservative, maintains firmness, extend shelf-life, prevent moisture loss, In accordance with regulated quantities specified in 9CFR424.21. |
| Trehalose | 0.0150 | Cryoprotectant, preservative, decreased $a_w$ (controls water functionality at protein/water interface), decreased cariogenic potential, freeze/thaw properties, stabilization of protein system |
| Sodium Tripolyphosphate | 0.0025 | Sequestering agent, reduce thaw drip, emulsifier, gelling, stabilizing agent to protect flavor and decrease amount of cooked juices out of product. In accordance with regulated quantities specified in 9CFR424.21. |
| Salt | 0.0100 | Enhances flavor, assists in cryoprotectant qualities of STPP and trehalose. |
| Spice Blends | 0.0075 | Flavor, visual appearance with particulates |

EXAMPLE 2

Recipe for No Pasta Chicken Lasagna

12 Italian Herb Flaquita chicken tortillas
32 oz spaghetti sauce
3 C spinach, chopped
2 C broccoli, chopped
2 Tbs garlic mined
2 C zucchini, sliced
24 oz ricotta
2 Tbs olive oil
2 Tbs Italian herb mix
1 tsp salt & black pepper
2 C mozzarella Sauté vegetables, herbs, salt & pepper in olive oil. Layer Flaquitas, sauce, vegetables, mozzarella and repeat for $2^{nd}$ layer in 9×12×4 baking pan. Bake in 350° oven for 20 minutes. Makes 12 servings.

EXAMPLE 3

Flaquitas Fajitas

12 Spicy Mexican Flaquitas chicken tortillas
2 red onions, sliced
2 ea. yellow, green, red bell peppers, sliced
2 Tbs olive oil
2 garlic cloves, minced
1 tsp salt & pepper
3 oz fajita seasoning
1 lime, juiced
Garnish:
8 oz sour cream
8 oz salsa
8 oz pepper jack cheese Sauté vegetables & spices and sprinkle with lime juice. Serve with warmed Flaquitas, sour cream, salsa, & cheese. Servings=12

EXAMPLE 4

Southwest Garden Wrap

1 Garden Herb Flauquita
¼ C mixed baby greens
2 Tbs roasted corn
1 Tbs roasted red bell pepper, chopped
1 tsp salt and pepper
vinaigrette or salad dressing Mix up salad and place mix into center of flaquita then drizzle with favorite salad dressing. Makes one garden wrap.

EXAMPLE 5

Cordon Bleu Chicken Wrap

6 Herb Garden Faquitas
12 slices maple ham
6 slices baby swiss cheese
1 tsp salt and pepper to taste Place 2 ham slices and 1 swiss cheese slice in middle of Flaquita. Roll up and with folded side down bake in oven at 350 degrees F. for 15 minutes until golden brown. Makes six servings.

EXAMPLE 6

Mexican Flaquita Pizza

3 Spicy Mexican Flaquitas
1 C shredded cheese
1 C fat free refried beans
½ C shredded lettuce
¼ C sour cream
Top with olives, tomato. Salsa, and jalapeno Place Flaquitas in 350 degree F. oven for 15–20 minutes until golden. Spread with beans and cheese. Then layer with another Flaquita and items of your choice then top with cheese. Broil pizza in oven until cheese melts. Cut with a sharp knife and enjoy. Makes one pizza.

EXAMPLE 7

Moo-Shu Rollup

10 Asian Spice Flaquitas
2 Tbs soy sauce
½ C sliced shiitake mushroom caps
¼ C coarsely chopped water chestnuts
1 tsp white pepper
½ C bean sprouts
2 Tbs green onions
2 Tbs minced ginger
2 Tbs hoisin sauce Stir-fry vegetables and spices for 2–3 minutes. Brush your Flauquitas with hoisin and fill with vegetable mixture. Roll up and serve. Makes ten servings.

EXAMPLE 8

Nutrition Label

Following is an example of a nutrition label that can be used according to the subject invention.

| Nutrition Facts | Amount Per Serving | % DV* | Amount Per Serving | % DV* |
|---|---|---|---|---|
|  | Total Fat 0 g | 0% | Total Carb. 2.6 g | 1% |
| Serving Size: | Saturated Fat 0 g | 0% | Dietary Fiber 0 g | 0% |
| 1 Flaquita (50 g) | Cholesterol 0 g | 0% | Sugars 2.6 g |  |
| Servings Per | Sodium 630 mg | 39% | Protein 12.6 g |  |
| Container: 50 | Vitamin A | 0% | Calcium | 0% |
| Calories: 62 | Vitamin C | 0% | Iron | 0% |
| Calories From Fat 0 |  |  |  |  |

*Percent Daily Values are based on a 2,000 calorie diet.

Nutritional Comparison between Flaquitas, Corn and Flour Tortillas.

|  | Flaquitas | Corn | Flour |
|---|---|---|---|
| Serving Size: 1 | 50 g | 41 g | 43 g |
| Calories | 62 | 56 | 120 |
| Fat | 0 g | 1 g | 2.5 g |
| Protein | 12.6 g | 1 g | 4 g |
| Carbohydrate | 2.6 g | 11 g | 22 g |
| Sodium | 630 mg | 650 mg | 475 mg |

In a preferred embodiment, the Flaquita's label is in a clear and easy to read format. This format is standardized in order to easily compare the Flaquitas to similar products. The label that is specifically exemplified herein was set up to address the nutrients that are an important focus to today's consumers. The order in which it appears reflects the priority of current dietary recommendations. All nutrients should be declared as a percentage of the Daily Values. These percents are based on a 2000 and 2500 calorie diet. By giving the information in a percent form it reduces the chance of information from being misinterpreted.

Depending upon an individual's dietary needs low values may not be necessarily good and high values may not be necessarily bad. Serving sizes should be stated in terms that are visually familiar to the consumer and reflect the amounts a consumer may eat. The sizes should be listed in both household and metric forms in order to be more universal.

Nutrient claims that are on the label must adhere to a set of standards. The Flaquita's claim of "Fat Free" can only be listed if there is less than 0.5 grams in each. As previously discussed, each Flaquita has 0 grams or negligible amounts of fat. Finally, ingredient declaration is required for foods that have more than one ingredient. The ingredient list is in descending order of predominance and is declared by common names (Schmidt, R. Regulation of Food Labeling. In *Government Regulations and the Food Industry*. University of Florida Coursebook, Gainesville, 2002; p. 166, 198).

All patents, patent applications, provisional applications, and publications referred to or cited herein are incorporated by reference in their entirety to the extent they are not inconsistent with the explicit teachings of this specification.

We claim:

1. A protein tortilla comprising at least 50% animal protein and less than 0.5 grams of fat per 50 grams of said tortilla; wherein said tortilla is sufficiently flexible to undergo folding or rolling movements without tearing; and wherein said tortilla is a gelled foam.

2. The tortilla, according to claim 1, wherein the animal protein is selected from the group consisting of chicken, fish, turkey, pork, poultry, venison and beef protein.

3. The tortilla, according to claim 1, wherein the animal protein is soluble in water at a pH within a range of 10 to 11.

4. The tortilla, according to claim 1, wherein the animal protein is extracted from an alkaline solution, wherein said alkaline solution comprises solubilized animal muscle in water.

5. The tortilla, according to claim 1, wherein the tortilla is round.

6. The tortilla, according to claim 5, wherein the diameter of the tortilla is from 3 inches to 12 inches.

7. The tortilla, according to claim 1, wherein the thickness of tortilla is from 1/32 inch to 1/4 inch.

8. The tortilla, according to claim 1, wherein the weight of the tortilla is from 20 grams to 80 grams.

9. The tortilla, according to claim 1, further comprising:
a) a sweetening agent; and
b) a flavor protector/enhancer.

10. The tortilla, according to claim 9, wherein the sweetening agent is selected from the group consisting of trehalose, sorbitol, and sucrose.

11. The tortilla, according to claim 9, wherein the flavor protector/enhancer is selected from the group consisting of sodium tripolyphosphate, sodium chloride, and spices.

12. The tortilla, according to claim 11, wherein the spice is selected from the group consisting of ajwain seed, allspice, annatto seed, basil, charnushka, chervil, chili powder, Chinese 5 spice powder, cilantro, cloves, coriander, cumin, curry, dill, fennel, fenugreek, galangal, garlic, ginger, kala jeera, lemongrass, lemon peel, marjoram, msg, mustard seed, oregano, paprika, parsley, peppercorn, rosemary, saffron, sage, sesame seed, sumac, tarragon, thyme, and zatar.

13. A protein tortilla produced according to the following steps:
a) dissolving, in water, an ingredient selected from the group consisting of sweetening agents, flavor protectors/enhancers, and a combination of both;
b) combining an animal protein, wherein the protein is selected from the group consisting of chicken, fish, turkey, pork, poultry, venison, and beef muscle, with the dissolved ingredient of step a), wherein the animal protein is isolated from an alkaline solution comprising solubilized animal muscle in water;
c) incorporating air into the protein and ingredient mixture for a period of time sufficient to create a foam;
d) adjusting the pH of the foam between about 7 and about 8; and
e) heating the foam, wherein the foam gels to form a protein tortilla of claim 1.

* * * * *

UNITED STATES PATENT AND TRADEMARK OFFICE
CERTIFICATE OF CORRECTION

| | |
|---|---|
| PATENT NO. | : 7,125,576 B2 |
| APPLICATION NO. | : 10/889927 |
| DATED | : October 24, 2006 |
| INVENTOR(S) | : O'Kelley et al. |

Page 1 of 1

It is certified that error appears in the above-identified patent and that said Letters Patent is hereby corrected as shown below:

Column 10,
Lines 28-39

| Nutrition Facts | Amount Per Serving | % DV* | Amount Per Serving | % DV* |
|---|---|---|---|---|
| | Total Fat 0 g | 0% | Total Carb. 2.6 g | 1% |
| Serving Size: | Saturated Fat 0 g | 0% | Dietary Fiber 0 g | 0% |
| 1 Flaquita (50 g) | Cholesterol 0 g | 0% | Sugars 2.6 g | |
| Servings Per | Sodium 630 mg | 39% | Protein 12.6 g | |
| Container: 50 | Vitamin A | 0% | Calcium | 0% |
| Calories: 62 | Vitamin C | 0% | Iron | 0% |
| Calories From Fat 0 | *Percent Daily Values are based on a 2,000 calorie diet. | | | | should read

| Nutrition Facts | Amount Per Serving | % DV* | Amount Per Serving | % DV* |
|---|---|---|---|---|
| | Total Fat 0 g | 0% | Total Carb. 2.6 g | 1% |
| Serving Size: | Saturated Fat 0 g | 0% | Dietary Fiber 0 g | 0% |
| 1 Flaquita (50 g) | Cholesterol 0 g | 0% | Sugars 2.6 g | |
| Servings Per | Sodium 630 mg | 39% | Protein 12.6 g | |
| Container: 50 | Vitamin A | 0% | Calcium | 0% |
| Calories: 62 | Vitamin C | 0% | Iron | 0% |
| Calories From Fat 0 | *Percent Daily Values are based on a 2,000 calorie diet. | | | |

INGREDIENTS: CHICKEN, WATER, SORBITOL, TREHALOSE, SALT, SPICE BLEND, SODIUM TRIPOLYPHOSPHATE

Signed and Sealed this

Twenty-seventh Day of March, 2007

JON W. DUDAS
*Director of the United States Patent and Trademark Office*